Patented Oct. 29, 1946

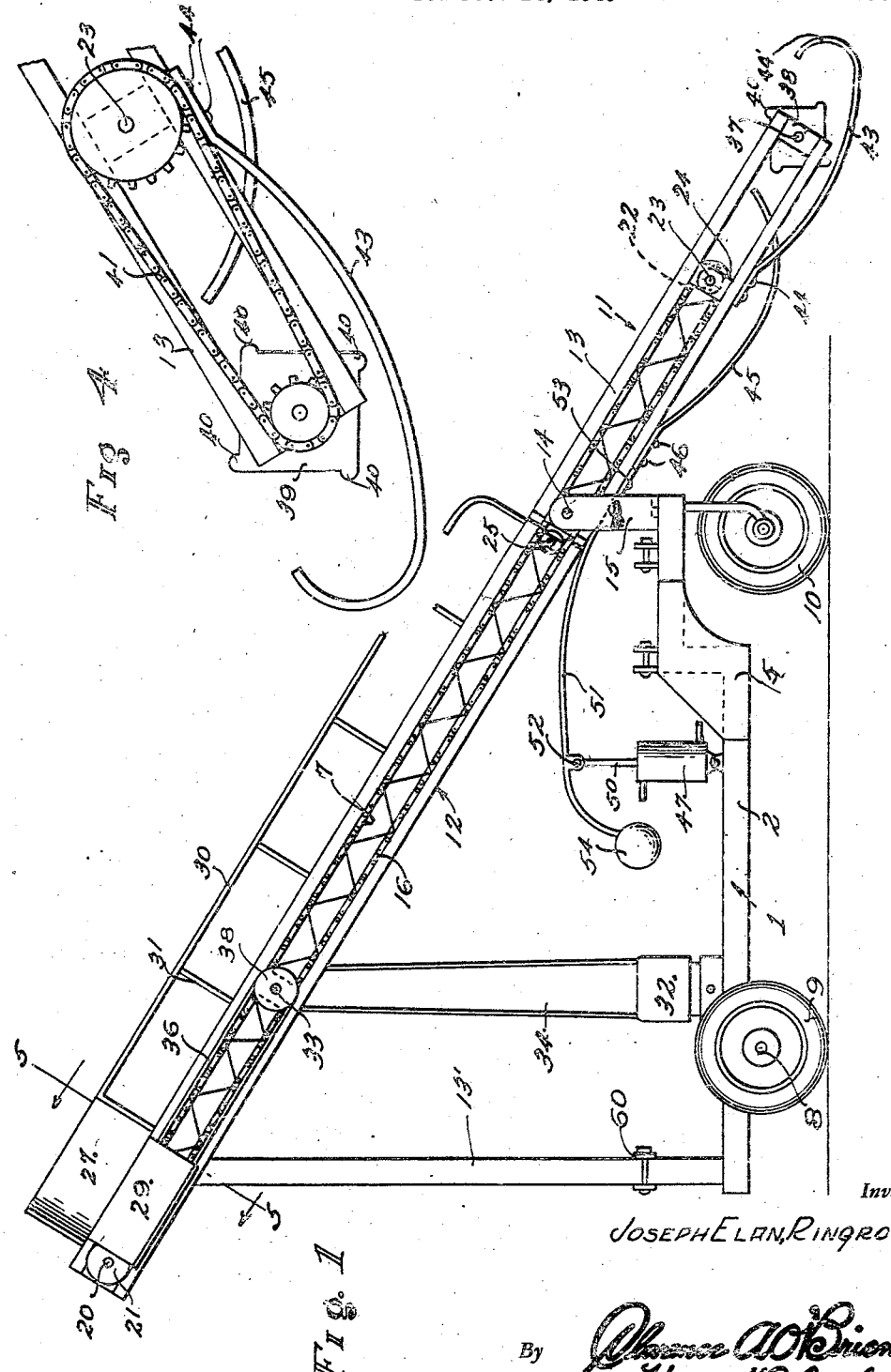

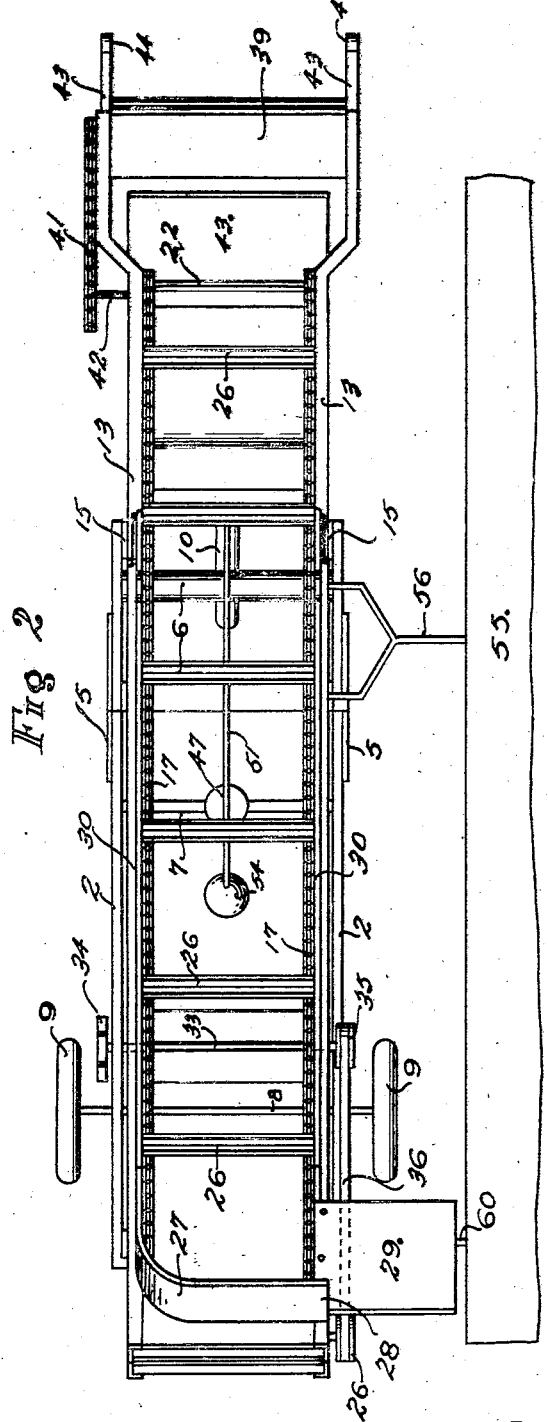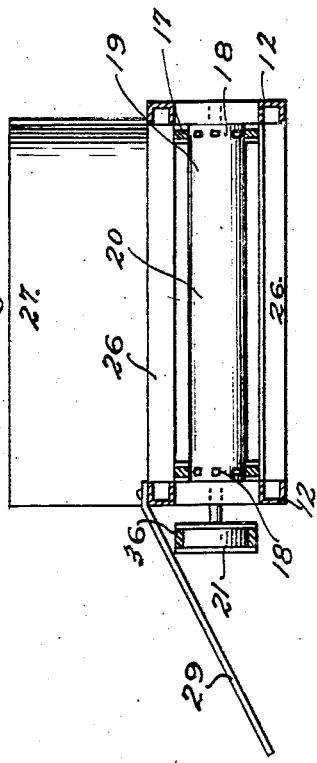
Inventor
JOSEPH ELAN. RINGROSE

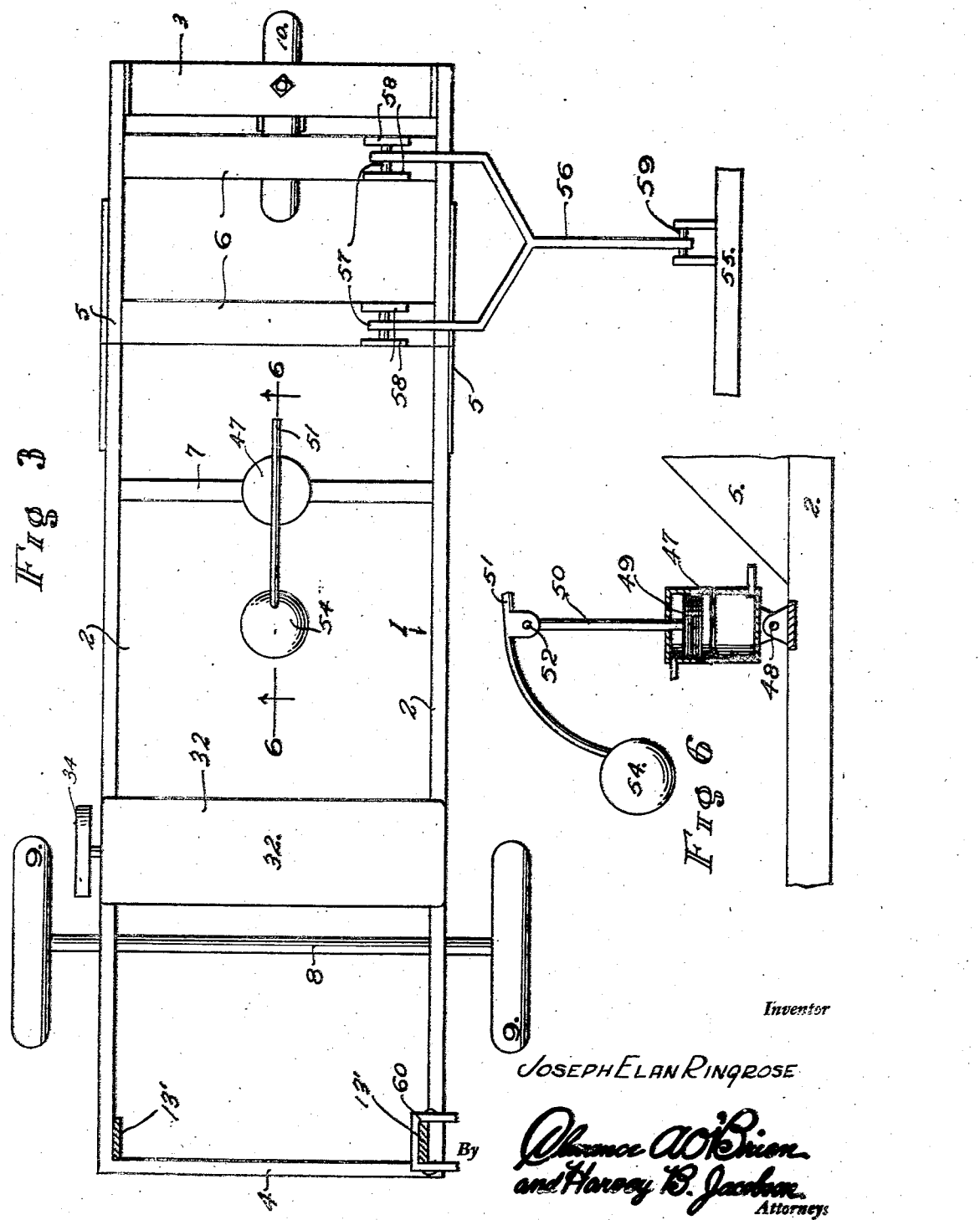

2,410,238

UNITED STATES PATENT OFFICE 2,410,238

HAY LOADING APPARATUS

Joseph Elan Ringrose, Redmond, Oreg.

Application December 14, 1943, Serial No. 514,269

1 Claim. (Cl. 198—9)

My invention relates to improvements in loading apparatus for use, more particularly, in loading baled hay.

The primary object of the invention is to provide simply constructed, efficient, labor-saving apparatus for attachment to a motor-driven truck alongside the same to be propelled over a field thereby, and which is equipped to pick up baled hay left in the field by a baler and load the same quickly into the truck.

Other and subordinate objects are also comprehended by my invention, all of which, together with the precise nature of my improvements, and the advantages thereof, will be readily understood when the succeeding description and claims are read with reference to the drawings accompanying and forming part of this specification.

In said drawings:

Figure 1 is a view in side elevation of my improved hay loading apparatus in its preferred embodiment, Figure 2 is a view in top plan, Figure 3 is a view in top plan of the chassis frame, running gear, the forward hitch, and means for adjusting the elevator structure, Figure 4 is a fragmentary view in side elevation of the front end portion of the elevator structure and parts carried thereby, and drawn to an enlarged scale, Figure 5 is a view in transverse section taken on the line 5—5 of Figure 1, and drawn to an enlarged scale, and Figure 6 is a view in vertical section taken on the line 6—6 of Figure 3, and drawn to an enlarged scale.

Referring to the drawings by numerals, my improved hay loading apparatus, in its preferred embodiment, comprises an elongated, rectangular chassis frame 1 including side bars 2, a pair of front and rear end bars 3, 4, respectively, reinforcing side cheek plates 5, a pair of front transverse, auxiliary reinforcing bars 6, and an intermediate reinforcing transverse bar 7.

Adjacent its rear end, the chassis frame 1 is supported by a suitable axle 8 equipped with a pair of suitable ground wheels 9, preferably rubber-tired. At its front end, said chassis frame 1 is supported by a single caster-type steering wheel 10 which may be mounted in any suitable manner on the front end bar 3.

Surmounting the chassis frame 1 and inclining upwardly and rearwardly over the same parallel therewith and from a substantial distance in front of the same, is an elevator structure including a front, relatively short, vertically swingable section 11 and a rear fixed section 12.

The front section 11 comprises skeleton side frames 13 suitably pivoted at the rear ends thereof on an axis member, as at 14, extending between a pair of side posts 15 rising from the front end of the chassis frame 1. The rear section 12 of the elevator structure comprises skeleton side frames 16, similar to the frames 13, suitably fixed at the front ends thereof on the axis member 14. Suitable uprights 13' rising from the rear end of the chassis frame 1 support the side frame sections 16 adjacent the rear ends thereof.

An endless chain-type conveyor extends longitudinally of the side frames 13, 16, said conveyor including side chains 17 supported at the rear end of the conveyor by a pair of sprocket wheels 18 on the ends of an idler roller 19 suitably fixed on a conveyor drive shaft 20 journaled, in any suitable manner, in the rear ends of the side frames 16 to extend across the same and equipped with a drive pulley 21. At the front end of said conveyor, the side chains 17 are supported by rollers 22 extending across the vertically swingable section 11 and journaled, as at 23, in bearings, as at 24, on the side frames 13 of said swingable section. As best shown in Figure 1, the front end of the conveyor is spaced rearwardly of the front end of said section 11 for a short distance and for a purpose presently clear. A transverse idler roller 25 extends across the front end of the section 12 to support the upper runs of the side chains 17 at that point. The usual cross bars 26 extend between the side chains 17 of the described conveyor.

At the rear end of the described elevator structure is a deflector plate 27 of right angled form extending from one of the side frames 16 of the section 12 across the upper run of the conveyor to what constitutes the unloading side of said elevator structure, said plate having a free end 28 overlying a downwardly inclined platform chute 29 extending laterally from the side frame 16 on said unloading side of said structure and suitably secured to said frame. Side guide rails 30 supported by upright posts 31 surmount the side frames 16 of the section 12 and extend from the front end thereof to a suitable point adjacent said plate and platform chute 28, 29, respectively.

A suitable motor 32 on the chassis frame 1 is operatively connected to the described conveyor to drive the same counterclockwise, as viewed in Figure 1 and by the following means:

Mounted on the side frame members 12 in any suitable manner is a cross shaft 33 to one end of which the motor 32 is operatively connected, as by a belt 34. A pulley 35 on the other end of said shaft 33 and a belt 36 connecting said pulley 35 to the beforementioned pulley 21 operatively connects said shaft 33 to the conveyor driving shaft 20.

Extending transversely between the front ends of the side frames 13 of the vertically swingable section 11, in advance of the described conveyor, is a bale pick-up roller, substantially rectangular in cross section, and journaled at its ends by stub shafts, as at 37, in bearings 38 on the front ends of said frames. The pick-up roller, designated 39, is provided with longitudinally extending, outstanding corner ribs 40 to facilitate picking up a bale of hay, and, as will presently more clearly appear, is designed to be rotated counterclockwise, as viewed in Figure 1, close to the ground, in the operation of the apparatus. A sprocket and chain drive 41 operatively connects a shaft 42 extending from the beforementioned roller 22 to one of the stub shafts 37, whereby said pick-up roller is rotated in the direction indicated.

A pair of downwardly bowed, resilient, bar-like shoes 43 are suitably fixed, as at 44, to the under sides of the side frames 13 of the vertically swingable section 11 to extend forwardly beneath the pick-up roller 39, said shoes having upwardly and rearwardly curved front ends 44' spaced for a suitable distance forwardly of said roller 39.

A downwardly bowed guard plate 45 is fixed at its rear end, as at 46, to the under sides of said side frames 13 to extend beneath the front ends of the conveyor chains, which is to say the conveyor, with its front end terminating between said conveyor and the pick-up roller 39 in approximate alignment with the top run of the conveyor. The guard plate 45 functions to protect the lower run of the conveyor against rocks and the like on the ground.

Means are provided for swinging the front section 11 of the elevator structure vertically comprising an upright pneumatic cylinder 47, pivoted, as at 48, on the cross bar 7 for oscillation in the plane of the elevator structure and having a piston 49 working therein equipped with an upstanding piston rod 50 to the upper end of which a lever arm 51 is pivoted, as at 52, and rigidly connected to the vertically swingable section 11, as at 53, so that when the piston rod 50 is moved downwardly, said section 11 will be swung upwardly to elevate the shoes 43 off the ground. The arm 51 is counterweighted, as at 54, to stabilize said arm against vibration.

The chassis frame 1 is connected adjacent its front end to one side of a motor truck or other propelling vehicle represented at 55 by means of a yoke-like front hitch 56 pivoted, as represented at 57, to brackets 58 rising from the beforementioned bars 6 and similarly pivoted, as represented at 59, to said side of the motor truck 55, the pivotal connections being such that the front end of the chassis frame 1 may move vertically relative to said motor truck. A rear hitch 60 pivoted on one of the uprights 13' is provided for connecting the rear end of the chassis frame 1 to said motor truck in a manner similar to that described with reference to the hitch 56.

The cylinder 47 may be connected in any suitable manner to a source of air under pressure, not shown, and suitable controls provided for causing vertical moving of the piston 49 under pressure and in opposite directions.

Referring now to the operation of the described apparatus, normally the shoes 43 are designed to ride over the ground and support the pick-up roller 39 slightly elevated above the ground for free rotation, the section 11, because of the described swinging mounting thereof, being free to float or ride over uneven ground, as will be clear. In this connection, the described means for swinging the section 11 is particularly adapted, because of the pivotal connections 48, 52 to permit free vertical floating movement of said section 11 to an extent such that the front end of the section may drop on uneven ground at least 2½ feet below the ground line of the wheels 9, 10, or, rise a like distance above such a line, when said section is in operation. The advantage is, of course, providing for pick-up operations over unusually uneven ground. As the apparatus is propelled over the field by the motor truck, with the described conveyor and pick-up roller operating in the direction previously described, the front ends 44' of the shoes 43 straddle a bale of hay deposited on the ground and the pick-up roller 39 tilts said bale upwardly so that it will clear the side frames 13 of the section 11, while, at the same time, said roller operates to move the bale rearwardly onto the conveyor. The conveyor transports the bale upwardly and rearwardly until it strikes the deflector plate 27, at which point it may be pulled by an operator off the conveyor onto the platform chute 29 to slide off the same into the motor truck 55. During the passage of the bale of hay up the elevator structure, the rails 30 prevent the bale from falling off the elevator structure, as will be obvious. When the apparatus is not in use, the vertically swingable section 11 may be swung upwardly, in the manner already described, to raise the shoes 43 off the ground in an out-of-the-way position.

The foregoing will, it is believed, suffice to impart a clear understanding of my invention without further explanation.

Manifestly, the invention, as described, is susceptible of modification without departing from the inventive concept, and right is herein reserved to such modifications as fall within the scope of the appended claim.

What I claim is:

Apparatus for loading bales of hay in a field onto a truck comprising a wheel-supported chassis frame, elevator structure surmounting said frame and inclining upwardly and rearwardly over the same, said structure comprising a vertically swingable front section, a transversely extending pick-up roller at the front end of said section, an endless conveyor extending into said section and having a front end terminating adjacent said roller, ground-engaging means on said section for maintaining the front end thereof and said roller off the ground comprising a pair of downwardly bowed bar-like side shoes having upwardly and rearwardly curved front ends in advance of said roller, and a guard plate on said section extending forwardly beneath the front end of the conveyor and upwardly between said end and said pick-up roller to protect the front end of the conveyor against rocks on the ground, said front section being full floating vertically and having a range of swinging movement at its front end well below and above the ground line of the chassis supporting wheels.

JOSEPH ELAN RINGROSE.